United States Patent [19]

Libowitz et al.

[11] 4,440,737
[45] Apr. 3, 1984

[54] ROOM TEMPERATURE REACTION OF VANADIUM-BASED ALLOYS WITH HYDROGEN

[75] Inventors: George G. Libowitz, Brookside; James F. Lynch, Plainfield; Arnulf J. Maeland, Succasunna, all of N.J.

[73] Assignee: Allied Corporation, Morris Township, Morris County, N.J.

[21] Appl. No.: 490,768

[22] Filed: May 2, 1983

Related U.S. Application Data

[63] Continuation-in-part of Ser. No. 420,467, Sep. 20, 1982, abandoned.

[51] Int. Cl.³ ................................................ C01B 6/24
[52] U.S. Cl. .................................. 423/644; 252/181.6; 420/424; 420/900
[58] Field of Search ................ 423/644; 420/424, 900; 252/181.6, 188.26

[56] References Cited

U.S. PATENT DOCUMENTS 4,111,689  9/1978  Liu ...................................... 423/644
4,318,897  3/1982  Gonczy .............................. 423/644
4,358,316  11/1982  Liu et al. ............................ 423/644

OTHER PUBLICATIONS

Kirschfeld et al., "Zeitschrift fur Eliktrochemie", vol. 36, 1930, pp. 123-129.

*Primary Examiner*—Herbert T. Carter
*Attorney, Agent, or Firm*—Thomas D. Hoffman; Alan M. Doernberg; Gerhard H. Fuchs

[57] ABSTRACT

A method of producing a vanadium-based metal hydride which comprises reacting hydrogen gas at a temperature between about 0° and 100° C. with a vanadium-based binary solid solution alloy having a body-centered cubic structure and having a formula $V_{1-x}M_x$, wherein M is a metal selected from the group consisting of manganese, chromium, cobalt, iron, nickel and mixtures thereof and wherein x varies from at least about 2 atom percent up to the solubility limit of cobalt, iron and nickel and up to about 20 mol % of manganese and up to about 40 mol % of chromium in said solid solution alloy is disclosed.

10 Claims, No Drawings

ROOM TEMPERATURE REACTION OF VANADIUM-BASED ALLOYS WITH HYDROGEN

CROSS REFERENCE TO RELATED APPLICATION

This application is a continuation-in-part of U.S. patent application Ser. No. 420,467, filed Sept. 20, 1982 now abandoned.

BACKGROUND OF THE INVENTION

The present invention relates to the reaction of hydrogen gas with vanadium-based metal alloys and more particularly to the rapid reaction at mild temperatures of hydrogen gas with solid solution alloys having a body-centered cubic structure and having a formula $V_{1-x}M_x$, wherein M is manganese, chromium, cobalt, iron, nickel or mixtures thereof and wherein x varies from at least about 2 atom percent up to the solubility limit of cobalt, iron or nickel and up to about 20 mol percent of manganese and up to about 40 mol percent of chromium in said solid solution alloys.

Most metals that form hydrides react very slowly in bulk for at room temperature with hydrogen gas. Metallic niobium and metallic vanadium, for example, are relatively inert in bulk form at room temperature in the presence of hydrogen gas, with the hydrogen only slowly reacting with the body-centered cubic structure of each metal to form a precipitated niobium hydride or vanadium hydride. Most other metals that form hydrides react in a similar fashion, with the rate of solution in the alpha phase formation and hydride formation varying among metals and alloys, but rarely occurring at room temperature in less than one hour. In the case of niobium, attempts to increase this rate by plating over niobium with nickel or palladium or iron have been reported.

In our co-pending, U.S. application Ser. No. 365,119, filed Apr. 5, 1982, it is disclosed that solid solution alloys of niobium or tantalum and a second metal such as aluminum, cobalt, manganese, molybdenum or vanadium react rapidly with hydrogen under mild conditions.

Metallic titanium is also relatively inert in the bulk form at room temperature in the presence of hydrogen gas, with hydrogen reacting only slowly with the hexagonal close packed structure of the metal to form a precipitated titanium hydride.

In our co-pending U.S. patent application Ser. No. 420,405 filed on Sept. 20, 1982, it is disclosed that various titanium-based solid solution alloys rapidly react with hydrogen at room temperature to form the corresponding hydrides. The titanium-based solid solution alloys have a body-centered cubic structure that comprises titanium and a second metal such as molybdenum, vanadium or niobium; when said second metal in said binary alloy is vanadium or niobium and, optionally, when said second metal is molybdenum, at least about 1 atom percent of a third metal such as aluminum, cobalt or iron is dissolved in said binary alloy.

For many applications of metal hydrides, such as hydrogen recovery, it is desirable to form the hydride from bulk metal, pulverize the hydride into some form of granular or powder structure, and thereafter cyclically remove hydrogen to form a lower hydride or the hydrogen-free metal and thereafter reintroduce hydrogen to reform the hydride. Starting with bulk metal or bulk alloy, it is normally necessary to go through an induction period, wherein the metal is heated to a temperature such as 300°–700° C., then reacted with hydrogen at high pressure and then cooled very slowly until a temperature below about 100° C., and preferably about room temperature, is reached. At the higher temperature, the rate of hydrogen dissolving in the metal (the alpha phase) is increased so as to achieve saturation in a matter of minutes rather than hours or days. At the high temperature, however, the equilibrium hydrogen pressure is so high that relatively little hydrogen actually dissolves or forms hydride. Accordingly, it is only upon gradual cooling that hydrides form. See, for example, U.S. Pat. No. 4,075,312 (Tanaka et al.) which discloses titanium alloy hydride compositions containing at least one metal selected from the group consisting of vanadium, chromium, manganese, molybdenum, iron, cobalt, and nickel.

U.S. Pat. No. 4,318,897 (Gonczy) discloses ferrovanadium alloys containing from about 5 to about 30% by weight iron, which may be used for hydrogen storage systems. However, U.S. Pat. No. 4,318,897 also discloses it is necessary to preactivate the ferrovanadium alloys by heating same in a vacuum at 400°–650° C. and thereafter exposing the alloy to hydrogen.

Kirschfeld et al. in "Zeitschrift for Elektrochemie,". Vol. 36, 1930, pp. 123–129 discloses that ferrovanadium alloys containing 29–90 by weight iron are heated to high temperatures in the presence of hydrogen to form the corresponding metal hydrides.

Thus, with the exception of the ongoing research in our laboratories, in all these disclosures, an initial induction period at a high temperature in the presence of hydrogen is required for hydride formation.

While many metals require only a single induction process to form the hydride, with the subsequent hydride powder cycling at a reasonable reaction rate, it should be apparent that the induction process represents a distinct disadvantage in forming and utilizing metal hydrides.

BRIEF DESCRIPTION OF THE INVENTION

It has been surprisingly found that certain vanadium-shaped solid solution alloys having a body-centered cubic structure, even in bulk form, react rapidly with hydrogen at mild temperatures, such as below about 100° C., forming hydrides in a matter of minutes, even at room temperature. Accordingly, the present invention includes a method of producing a vanadium-based metal hydride which comprises reacting a hydrogen gas at a temperature between about 0° C. and about 100° C. with a vanadium-based binary solid solution alloy, having a body-centered cubic structure and having a formula $V_{1-x}M_x$, wherein M is a metal selected from the group consisting of manganese, chromium, cobalt, iron, nickel and mixtures thereof and wherein x varies from at least about 5 atom percent about up to the solubility limit of cobalt, iron and nickel up to about 20 mol% of manganese and up to about 40 mol% of chromium in said solid solution alloy;

wherein the reaction rate of said solid solution alloy with hydrogen at said temperature is at least about 100 times the reaction rate of un-alloyed vanadium with hydrogen at said temperature and identical hydrogen pressures.

DETAILED DESCRIPTION OF THE INVENTION

The present invention involves the reaction of hydrogen gas at low temperatures with a vanadium-based solid solution alloy having the body-centered cubic structure and having the formula $V_{1-x}M_x$ wherein M is manganese, chromium, cobalt, iron, nickel or mixtures thereof. The selected second metals recited hereinabove have an atomic radius at least about 4% smaller than the metallic radius of vanadium. The few selected second metals effect the rate of reaction of the vanadium-based solid solution alloy with hydrogen, the capacity of the said solid solution alloy (defined as H/M) and the plateau pressure.

Vanadium metal exhibits the body-centered cubic structure. Vanadium-based solid solution alloys containing definite amounts of manganese, chromium, cobalt, iron, nickel or mixtures thereof can be prepared without changing the body-centered cubic structure of the parent vanadium metal; the solubility limits are 7 atom percent for cobalt, 7–8 atom percent for nickel; 33 atom percent for iron; and about 50 atom percent for manganese; chromium is completely miscible with vanadium. Vanadium-based binary solid solution alloys containing manganese, chromium, cobalt, nickel or iron in amounts equal to or greater than about 2 atom percent and up to the solubility limit of cobalt, nickel or iron and up to about 20 mol% of manganese or up to about 40 mol% of chromium in vanadium react almost immediately with hydrogen at 25° C. after an induction period of about 10 minutes to about 1 hour, especially with about 2–5 atom percent of the second metal. For vanadium-iron solid solution alloys, the preferred composition is at least about 2 atom percent up to about 22, more preferably at least about 2 to about 5 atom percent, of iron. For vanadium-chromium and vanadium-manganese solid solution alloys, it is preferred to add at least about 2 atom percent up to about 15 atom percent, more preferably at least about 2 to about 5 atom percent of chromium and manganese, respectively. The hydrogen gas employed may be pure hydrogen, at a pressure above the dissociation pressure of the hydride formed at the reaction temperature, e.g., at subatmospheric, atmospheric or superatmospheric pressures such as between about 0.1 kPa and about 10,000 kPa and preferably 5000–7000 kPa (50–70 atm). Such pressures may also be employed as the partial pressure of hydrogen in a mixture with other gases which do not poison the hydride forming reaction. The hydrogen may be mixed with inert gases such as argon, helium and nitrogen. The present invention may be used as a means of removing hydrogen from such gas mixtures and storage of hydrogen in the form of hydrides of solid solution alloys. The present invention may also be used as a getter for hydrogen in vacuum systems. The reaction temperature is desirably between about 0° C. and about 100° C., preferably between about 20° and 50° C., when the reaction is initiated. Because many of the reactions within the scope of the present invention are highly exothermic, it is contemplated that the temperature may, for short times, exceed 100° C. without adverse effect upon the reaction. In fact, in many of the present reactions, heat removal acts as the rate limiting step, with the reaction taking place in seconds if adequate heat removal is provided. It is preferred to initiate the reaction below about 50° C., with room temperature being a convenient place to start.

The hydrogen capacity, H/M, of the solid solution alloys is about 0.8–1 for V-Fe, about 0.8–1 for V-Ni, about 0.9 for V-Co, about 1–1.2 for V-Mn, samples containing about 2 to about 5 atom percent of iron, nickel, cobalt and manganese, respectively and about 1.8–2 for V-Cr samples containing about 2 atom percent up to about 15 atom percent of chromium.

The following examples illustrate the present invention and show by comparison certain metals and alloys outside the scope of the present invention which react only slowly with hydrogen at mild temperatures. It should be understood that various additions, deletions and modifications of the examples are contemplated within the scope and spirit of the present invention as set forth in the claims that follow.

EXAMPLE 1

The following alloys were prepared by arc melting, on a water-cooled copper hearth under argon: 95 mol% of vanadium and separately 5 mol% of iron, cobalt and nickel; 98 mol% of vanadium and 2 mol% of iron; 96.9 mol% vanadium and 3.1 mol% of manganese; and 97.2 mol% of vanadium and 2.8 mol% of manganese. Each batch was approximately 4 g. The alloys were cast under argon into buttons approximately 10–12 mm diameter and 7–9 mm height; each button was allowed to cool to near room temperature and remelted; this process was repeated 3–4 times to ensure homogenization. Each 4 g alloy button was fractured and placed in a high pressure stainless steel reaction vessel of known volume which was then connected to a vacuum system of known volume and evacuated (about $10^{-3}$ Torr) while the sample was heated (outgassed) at 600°. Each sample was then cooled to room temperature. Hydrogen was admitted at room temperature to a pressure of 850 psig (59 atm). For alloys containing 95 mol% V, there was a short induction period that varied from a few minutes for V-Co and for V-Fe to about an hour and a half for V-Ni; hydrogen absorption began immediately thereafter, was substantial after 60 seconds, and was about complete within less than 60–90 minutes. For the alloys containing 96.9–98 mol% of V, the induction period varied from a few minutes for V-Fe to about 10 minutes for V-Mn; hydrogen absorption began immediately thereafter and was complete in about 2 hours for V-Mn and in about 16 hours for V-Fe. To verify that hydrogen absorption was complete, additional hydrogen was admitted at room temperature to each sample without further hydrogen uptake. The composition of the hydride phases was determined from the total pressure drop in the system. At the conclusion of the reaction, the formation of the non-stoichiometric monohydride phases was confirmed by subsequent X-ray diffraction analysis. The results are summarized in Table 1.

TABLE 1

| Alloy Composition | Time to 90% Complete Reaction at 25° C. (Min)[a] | Hydride Composition[b] |
|---|---|---|
| V (control) | No $R_xC$ | 0 |
| $V_{0.95}Co_{0.05}$ | 90[d] | 0.88 |
| $V_{0.95}Co_{0.05}$ | 10 | 0.95 |
| $V_{0.98}Fe_{0.02}$ | 16[e] | 1.02 |
| $V_{0.95}Fe_{0.05}$ | 10 | 0.9 |
| $V_{0.95}Ni_{0.05}$ | 10 | 0.9 |
| $V_{0.98}Cr_{0.02}$ | 40[e] | 1.77[f] |
| $V_{0.95}Cr_{0.05}$ | ca.10[g] | 1.86 |
| $V_{0.90}Cr_{0.10}$ | 10[j] | >1.3 |

TABLE 1-continued

| Alloy Composition | Time to 90% Complete Reaction at 25° C. (Min)[a] | Hydride Composition[b] |
|---|---|---|
| $V_{0.80}Cr_{0.20}$ | 10 | 0.56 |
| $V_{0.969}Mn_{0.031}$ | — | 1.02[h] |
| $V_{0.972}M_{0.028}$ | 120 | 1.12[i] |

Footnotes
[a]Reaction times exclusive of induction periods.
[b]Hydrogen atom to metal atom ratio = H/M.
[c]No reaction with $H_2$ ($P_{H2}$ = 55 atm) after 24 hrs. at room temperature. It is also believed that there would be no measurable room temperature reaction of V with $H_2$ at $P_{H2}$ = 75 atm.
[d]Hydrogen pressure was 32 atm.
[e]Hours
[f]H/M was 1.52 after 16 hrs (Hydrogen pressures = 26 atm) and 1.77 after 40 hrs. at a hydrogen pressure of 62 atm.
[g]Hydrogen pressure was 102 atm.
[h]Hydrogen pressure was 25 atm.
[i]Hydrogen pressure was 38 atm.
[j]The rate of formation of monohydride is much faster than that of formation of dihydride. It is believed that the maximum H/M would be ca. 1.8–1.9.

COMPARATIVE EXAMPLE 2

The procedure and apparatus of Example 1 was used excepting that 80 mol%, 90 mol% 95% mol% and, 98 mol% of vanadium was used with 20 mol%, 10 mol%, 5 mol%, and 2 mol% of chromium, respectively.

The samples containing 10 and 20 mol% chromium were outgassed at room temperature and placed in the SS apparatus of Example 1. Hydrogen was admitted at room temperature to a pressure of 850 psig (59 atm). After a short induction period of a few minutes, hydrogen absorption began immediately for V-Cr samples containing 10 and 20 mol% Cr and was complete within 10 minutes. Additional hydrogen was admitted; the applied hydrogen pressure was 69 atm for $V_{0.90}Cr_{0.10}$ and was 74 atm for $V_{0.80}Cr_{0.20}$. The rate of formation of dihydride of $V_{0.90}Cr_{0.10}$ was much slower than the rate of formation of the monohydride of same and it is believed the maximum H/M would be ca. 1.8–1.9.

The V-Cr samples containing 2 and 5 mol% Cr did not react with hydrogen at 50 atm and room temperature after outgassing at room temperature. After outgassing the sample with 2 mol% Cr at 600° and cooling same to room temperature, reaction with hydrogen was observed at 50 atm after an induction of 2 hours. After 16 hours, the H/M was 1.515 at an equilibrium pressure of 26 atm. The hydrogen pressure was increased to about 68 atm; after another 16 hours, the H/M was 1.77 at an equilibrium pressure of 62 atm. In the case of the V-Cr sample containing 5 mol% of Cr, hydrogen was admitted stepwise. Finally, additional hydrogen was admitted at room temperature to produce a pressure of ca. 102 atm. After an induction period of less than 48 hours, hydrogen absorption began.

The compositions were determined as described in Example 1. See Table 1 for summary of the results.

EXAMPLE 3

The procedure and apparatus of Example 1 are used excepting that the following vanadium-based alloys are prepared and reacted with $H_2$: $V_{0.93}Co_{0.07}$, $V_{0.90}Fe_{0.10}$, $V_{0.85}Fe_{0.15}$, $V_{0.78}Fe_{0.22}$, $V_{0.67}Fe_{0.33}$, $V_{0.95}Mn_{0.05}$, $V_{0.90}Mn_{0.10}$, $V_{0.85}Mn_{0.15}$, $V_{0.80}Mn_{0.20}$ and $V_{0.93}Ni_{0.07}$. Results similar to those reported in Example 1 are expected.

We claim:

1. A method of producing a vanadium-based metal hydride which comprises reacting hydrogen gas at a temperature between about 0° C. and 100° C. with a vanadium-based binary solid solution alloy having a body-centered cubic structure and having a formula $V_{1-x}M_x$, wherein M is a metal selected from the group consisting of manganese, chromium, cobalt, iron, nickel and mixtures thereof and wherein x varies from at least about 2 atom percent up to the solubility limit of cobalt, iron, nickel and up to about 20 mol percent of manganese and up to about 40 mol percent of chromium in said solid solution alloy;

Wherein the reaction rate of said solid solution alloy with hydrogen at said temperature is at least about 100 times the reaction rate of un-alloyed vanadium with hydrogen at said temperature and identical hydrogen pressures and wherein the reacting of said solid solution alloy with hydrogen at said temperature is effected without preactivation of said solid solution alloy with hydrogen at a elevated temperature.

2. The method of claim 1 wherein M is iron.
3. The method of claim 2 wherein x varies from at least about 2 atom percent to about 22 atom percent.
4. The method of claim 2 wherein x varies from at least about 2 atom percent to about 5 atom percent.
5. The method of claim 1 wherein M is nickel.
6. The method of claim 1 wherein M is cobalt.
7. The method of claim 1 wherein M is chromium.
8. The method of claim 7 wherein the hydrogen pressure is in the range of about 50–70 atms (5000–7000 kPa).
9. The method of claim 1 wherein M is manganese.
10. The method of claim 1 wherein the temperature of the initial contacting of hydrogen gas with said solid solution is from about 20°–50° C.

* * * * *